(12) United States Patent
Chana

(10) Patent No.: US 9,329,093 B2
(45) Date of Patent: May 3, 2016

(54) DETERMINING TORQUE IN A SHAFT

(75) Inventor: Kam S. Chana, Oxford (GB)

(73) Assignee: Isis Innovation Limited, Oxford (GB)

( * ) Notice: Subject to any disclaimer, the term of this patent is extended or adjusted under 35 U.S.C. 154(b) by 0 days.

(21) Appl. No.: 14/237,897

(22) PCT Filed: Aug. 10, 2012

(86) PCT No.: PCT/GB2012/051963
§ 371 (c)(1),
(2), (4) Date: Mar. 27, 2014

(87) PCT Pub. No.: WO2013/021216
PCT Pub. Date: Feb. 14, 2013

(65) Prior Publication Data
US 2014/0216173 A1    Aug. 7, 2014

(30) Foreign Application Priority Data
Aug. 10, 2011 (GB) .................................. 1113807.0

(51) Int. Cl.
  *G01L 1/22* (2006.01)
  *G01L 3/10* (2006.01)
(52) U.S. Cl.
  CPC .. G01L 3/10 (2013.01); G01L 3/108 (2013.01)
(58) Field of Classification Search
  CPC .................................. G01L 3/10; G01L 3/108
  USPC ............. 73/862.08, 862.381, 862.338, 862, 8
  See application file for complete search history.

(56) References Cited

U.S. PATENT DOCUMENTS

| | | | | | |
|---|---|---|---|---|---|
| 4,319,750 | A | * | 3/1982 | Roy | 473/320 |
| 4,532,832 | A | * | 8/1985 | Christensen | 81/57.29 |
| 4,562,844 | A | * | 1/1986 | Carpenter et al. | 600/488 |
| 4,673,314 | A | * | 6/1987 | Hara et al. | 405/215 |
| 4,802,540 | A | * | 2/1989 | Grabovac et al. | 177/211 |
| 5,454,788 | A | * | 10/1995 | Walker et al. | 604/99.04 |
| 5,533,813 | A | * | 7/1996 | Makino et al. | 384/115 |
| 5,585,572 | A | * | 12/1996 | Kindler | 73/862.338 |
| 5,588,788 | A | * | 12/1996 | Dominguez | 411/482 |
| 6,047,605 | A | * | 4/2000 | Garshelis | 73/862.336 |
| 6,117,021 | A | * | 9/2000 | Crow et al. | 473/289 |
| 6,519,912 | B1 | * | 2/2003 | Eckmann et al. | 52/847 |

(Continued)

FOREIGN PATENT DOCUMENTS

| | | |
|---|---|---|
| EP | 0285260 | 10/1988 |
| JP | 04-009631 | 1/1992 |

(Continued)

OTHER PUBLICATIONS

International Search Report and the Written Opinion Dated Jan. 15, 2013 From the International Searching Authority Re. Application No. PCT/GB2012/051963.

(Continued)

*Primary Examiner* — Max Noori

(57) ABSTRACT

The present invention relates to an apparatus for determining torque in a shaft, the apparatus comprising an elongate member with a weakened region partway along its length, and means for securing the member to the shaft either side of the weakened region, preferably adjacent each end of the elongate member. The invention extends to a method of localising the twist a shaft undergoes, comprising securing an elongate member to a shaft, wherein the elongate member comprises a weakened region partway along its length.

21 Claims, 11 Drawing Sheets

(56) References Cited

U.S. PATENT DOCUMENTS

| | | |
|---|---|---|
| 7,171,861 B2 * | 2/2007 | Mackel et al. ............ 73/862.193 |
| 2004/0016330 A1 * | 1/2004 | McCarty et al. .................. 83/13 |
| 2006/0287665 A1 * | 12/2006 | Burton et al. ................. 606/192 |
| 2007/0123928 A1 * | 5/2007 | Farnan ........................... 606/200 |
| 2008/0051671 A1 * | 2/2008 | Broome et al. ............... 600/504 |
| 2009/0204132 A1 * | 8/2009 | Ortiz et al. .................... 606/157 |
| 2010/0057050 A1 * | 3/2010 | Webler, Jr. .................... 604/525 |
| 2010/0114149 A1 * | 5/2010 | Albrecht et al. .............. 606/192 |
| 2010/0225083 A1 * | 9/2010 | Jung ....................... 280/124.107 |
| 2010/0251861 A1 * | 10/2010 | Sixto et al. ...................... 81/467 |

FOREIGN PATENT DOCUMENTS

| | | |
|---|---|---|
| KR | 10-0631808 | 9/2006 |
| WO | WO 2013/021216 | 2/2013 |

OTHER PUBLICATIONS

Patents Act 1977: Search Report Under Section 17(5) Dated Dec. 15, 2011 From the Intellectual Property Office of the United Kingdom Re. Application No. GB1113807.0.

\* cited by examiner

DETERMINING TORQUE IN A SHAFT

RELATED APPLICATIONS

This application is a National Phase of PCT Patent Application No. PCT/GB2012/051963 having International filing date of Feb. 10, 2012, which claims the benefit of priority of GB Patent Application No. 1113807.0 filed on Aug. 10, 2011. The contents of the above applications are all incorporated by reference as if fully set forth herein in their entirety.

FIELD OF THE INVENTION

The present invention relates to an apparatus for determining torque in a shaft. In particular the invention relates to an apparatus that determines the torque in a shaft by measuring an angle of twist, or a strain. The invention also relates to a method of localising the twist a shaft undergoes.

SUMMARY OF INVENTION

In broad terms, an apparatus for determining torque in a shaft, in particular a relatively large, stiff shaft, mechanically amplifies the strain by concentrating the twist over a short distance. A large proportion of the strain is collected and concentrated in a short region. Amplifying the strain enables improvement of the signal to noise ratio for shaft torque measurements. Improvement of the signal to noise ratio means that torque levels can be measured to much greater accuracies —for example down to 0.25% where conventional systems would struggle to achieve even 5%.

According to an aspect of the present invention there is provided an apparatus for determining torque in a shaft, the apparatus comprising: an elongate member with a weakened region partway along its length; and means for securing the member to the shaft either side of the weakened region, preferably adjacent each end of the elongate member.

By adding a coupling over the shaft in the form of an elongate member that has a weakened region partway along its length, the twist over the coupling length can be concentrated over the weakened region. By securing the ends of the elongate member to the shaft, the twist of the shaft between the two ends is transmitted to the elongate member. The weakened region undergoes a greater twist than the remaining elongate member, hence concentrating the twist in a shorter region. Localising the twist generates a larger strain which can be used to produce a larger measurement signal. Measurements are subject to measurement inaccuracy such as noise, and by measuring a comparatively larger signal, the signal to noise ratio is increased, thus decreasing the effect of this noise, yielding more accurate results. The longer the member is, the larger the strain collected may be, and hence the more accurate the measurement may be.

Preferably, the means for securing the member comprises a pair of collars for clamping to a shaft, preferably wherein the elongate member is connected at each end to a respective collar. By providing a collar or other relatively short annular securing means, an end of the apparatus can be clamped to the shaft on a relatively short region of the shaft. Thus the stiffness of the shaft with the apparatus attached is not significantly affected by the apparatus, and therefore the twist the shaft undergoes is not significantly affected by the apparatus. By connecting the elongate member at each end to a respective collar (or other relatively short annular securing means), the twist of the shaft over the entire length of the elongate member may be collected.

Preferably, the apparatus further comprises means for determining torque, preferably wherein torque is determined by measuring at least one of: angle of twist; strain. The strain may for instance be measured with a strain gauge or a plurality of strain gauges. The torque can be calculated with the appropriate formulae and constants from either strain or twist measurements.

Preferably, the apparatus comprises two longitudinal parts. By providing two longitudinal parts, the apparatus can be secured to the shaft by clamping the two parts to one another with the shaft between them. This allows attachment and removal of the apparatus. In particular no access to the end of the shaft is required. The apparatus can be removed for servicing. Further, there is no requirement to modify the shaft for attaching the apparatus.

Preferably, the torsional stiffness ratio between: the elongate member with the weakened region; and the weakened region only; is less than 5:1. More preferably, the torsional stiffness ratio between: the elongate member with the weakened region; and the weakened region only; is between 5:1 and 1:1. Yet more preferably, the torsional stiffness ratio between: the elongate member with the weakened region; and the weakened region only; is between 1.5:1 and 1:1. If the ratio is near unity, then the strength of the elongate member (with the weakened region) is to a large part determined by the strength of the weakened region. If this is the case, then the twist that is transmitted from the shaft occurs to a large part in the weakened region, and only little deformation occurs in the regions to either side of the weakened region. This allows efficient concentration of the strain.

Preferably, the ratio between the length of the elongate member and the length of the weakened region is between 100:1 and 5:1. More preferably, the ratio between the length of the elongate member and the length of the weakened region is between 40:1 and 10:1. Yet more preferably, the ratio between the length of the elongate member and the length of the weakened region is 20:1. The length of the elongate member determines the twist transmitted to the apparatus from a shaft. The shorter the weakened region is, the greater the concentration. The greater the ratio is, the greater the concentration is.

Preferably, the apparatus further comprises a strain gauge, and more preferably the weakened region has approximately the same length as the strain gauge. This allows optimal concentration of the strain measured by the strain gauge.

Preferably, the torsional stiffness ratio of the shaft and the apparatus is greater than 10:1. More preferably, the torsional stiffness ratio of the shaft and the apparatus is between 1000:1 and 10:1. Yet more preferably, the torsional stiffness ratio of the shaft and the apparatus is 200:1. The less stiff the apparatus as a whole is compared to the shaft, the lower the contribution of the apparatus is to the combined stiffness, and therefore the less the apparatus affects (in effect: reduces) the twist the shaft undergoes.

Preferably, the elongate member is in the shape of one of: a cylinder; a rod; a plurality of rods. A cylindrical elongate member can provide a shelter for components within the cylinder. Other shapes are possible, such as a member with a hollow hexagonal cross-section. A rod or a plurality of rods may provide a lighter weight design that may be cheaper to produce.

Preferably, the weakened region is characterised by a groove. A groove is cheap and efficient to produce. The groove may be rectangular, notched, necked, or otherwise shaped. In the case of a cylindrical elongate member, the groove is preferentially circumferential. Preferably, the groove is on the outer surface of the elongate member. This enables optimal amplification. Preferably a strain gauge is incorporated on the inner surface of the elongate member, thus protecting the strain gauge from damage.

The weakened region may be characterised (or formed) by a material that is weaker than the rest of the elongate member. The weakened region may be a portion of the elongate member with a lower shear modulus than the surrounding material. This provides the advantage of design freedom.

Preferably, the apparatus further comprises at least one of the following, preferably mounted on the inner surface of the apparatus: a battery; an electronic signal processing unit; a data transfer telemetry unit; and a power supply unit. Preferably, these components are mounted on the inner surface of a cylindrical elongate member. This provides protection to the components from damage. The elongated member can also provide containment from rotation for inner surface apparatus or devices.

According to a further aspect of the present invention there is provided a method of localising the twist a shaft undergoes, comprising securing an elongate member to a shaft, wherein the elongate member comprising a weakened region partway along its length. Localising the twist can be used to produce a larger measurement signal. Measurements are subject to measurement inaccuracy such as noise, and by measuring a comparatively larger signal, the signal to noise ratio is increased, thus decreasing the effect of this noise, yielding more accurate results.

Preferably, the member is secured to the shaft either side of the weakened region, preferably adjacent each end of the elongate member. By securing the ends of the elongate member to the shaft, the twist of the shaft between the two ends is transmitted to the elongate member. The weakened region undergoes a greater twist than the remaining elongate member, hence concentrating the twist in a shorter region.

Preferably, the weakness of the weakened region is adapted in dependence on the pre-determined maximal twist the shaft undergoes. This allows making a small modification to the device for suitability to different load scenarios. Preferably, the weakened region is characterised by a groove, and more preferably the weakness is adapted by providing a deeper or shallower groove.

Further features of the invention are characterised by the dependent claims.

The invention extends to methods and/or apparatus substantially as herein described with reference to the accompanying drawings.

Any apparatus feature as described herein may also be provided as a method feature, and vice versa. As used herein, means plus function features may be expressed alternatively in terms of their corresponding structure, such as a suitably programmed processor and associated memory.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE DRAWINGS

These and other aspects of the present invention will become apparent from the following exemplary embodiments that are described with reference to the following figures in which.

DESCRIPTION

Figure 1:
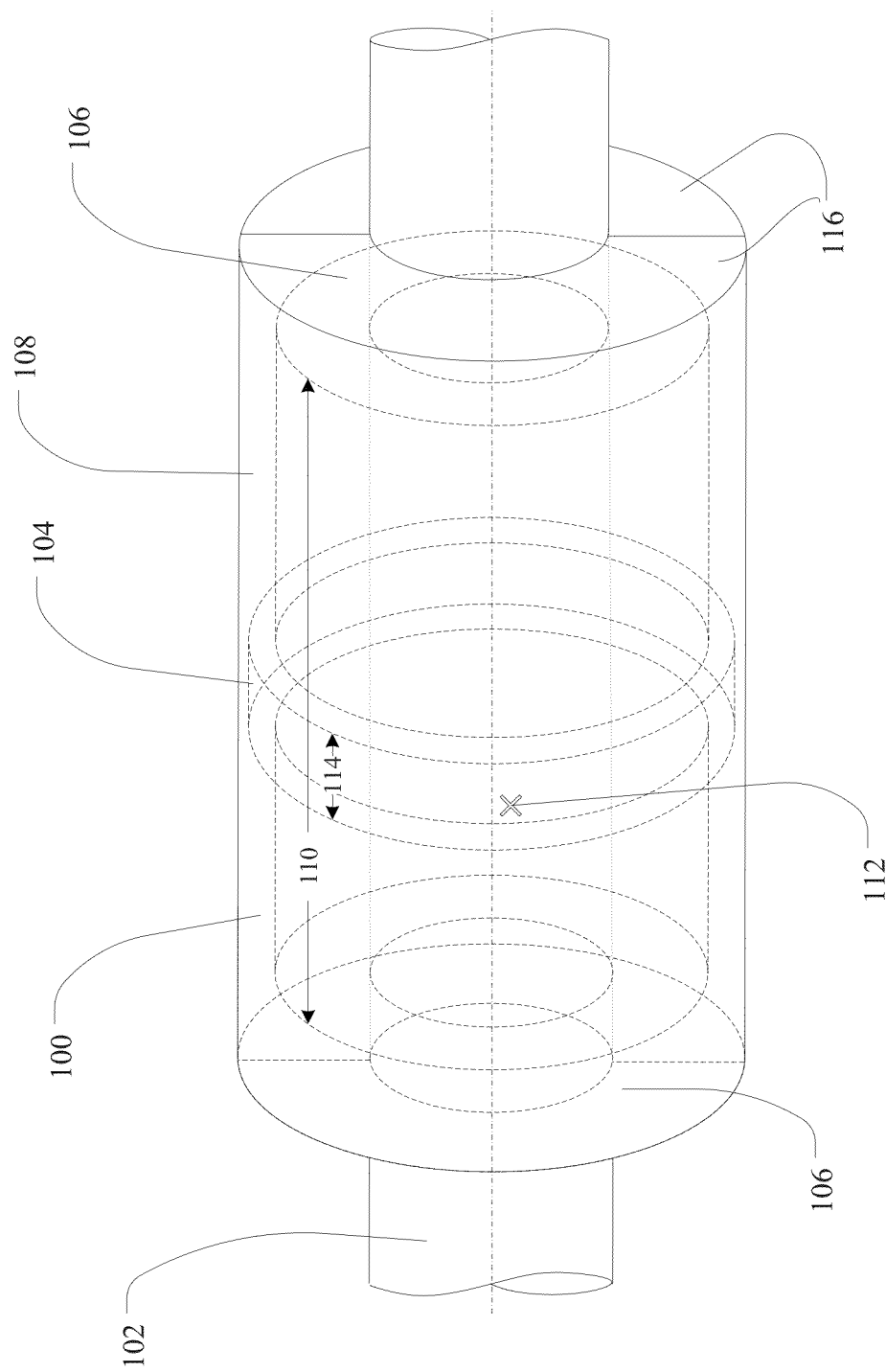
FIG. 1 shows a mechanical shaft torque amplifier attached to a shaft.

Torsion T can be calculated from the angle of twist $\varphi$, the shear modulus G, the torsion constant J, and the length l of the object under consideration. Torsion T can also be calculated from the surface shear stress $\tau$, the torsion constant J, and the surface radius R with:

$$T = \frac{\varphi G J}{l} = \frac{\tau J}{R}$$

The torsional rigidity is GJ, and the torsional stiffness is (GJ/l).

Measurement of constant or dynamic torque on large diameter solid shafts that twist by a fraction of a degree per meter can be challenging. Employing strain gauges on a shaft of very low twist leads to low signal to noise ratios.

For example, in the case of large industrial gas and steam turbines where a shaft connects the turbine to the generator the shafts are generally designed to be very stiff, for long life. The diameter can be typically around 300 mm and the shaft may twist in the order 0.2° per meter.

Measuring the twist/strain in such a scenario using strain gauges gives a very low signal to noise ratio. This is because a typical strain gauge is no more than 5 mm long which means that the twist experienced by the strain gauge over its length will be 0.001° (0.2*5/1000).

Furthermore, torque measuring devices for stiff shafts generally require access to the ends of the shaft and to a significant portion of the shaft. However, often the ends of the shaft are not accessible. Only short sections (typically 150 mm sections) of the shaft may accessible between bearing housing and other hardware.

To satisfy the need of measuring the induced strains on a shaft with appropriate accuracy and without disconnecting the shaft or obstructing its movement, a shaft torque (or strain) amplifier, with a good signal to noise ratio and an unobtrusive attachment mechanism is required. Hence there is a need for a mechanical shaft torque amplifier as described herein.

The mechanical shaft torque amplifier amplifies the strain in a relatively large, stiff shaft by concentrating the twist over a short distance. This enables improvement of the signal to noise ratio for shaft torque measurements.

The mechanical shaft torque amplifier can be used over any range of torques as the mechanical shaft torque amplifier itself does not have to transmit the full torque (the shaft still transmits torque). This is a major advantage as measuring particularly large torques in the range of hundreds of Newton meters (Nm) can be difficult with conventional devices. For example, when measuring a torque of 500 Nm achieving a measurement accuracy of 5 Nm is very difficult if the device has to transmit such a large torque and resolve the torque level to 1%.

A large proportion of the strain is collected and concentrated in a short region, which provides a larger strain. By adding a coupling over the shaft that has a short, reduced-stiffness region, the twist over the coupling length can be concentrated over this short region. A larger twist (strain) can therefore be experience by the instrumentation (typically a strain gauge) fitted in reduced-stiffness region. Strain gauges produce noise, and by measuring a comparatively larger twist (and strain) in the reduced-stiffness region (instead of directly on the shaft), the signal to noise ratio is increased, thus decreasing the effect of this noise, yielding more accurate results.

By concentrating a large twist over a short region, improved signal to noise ratios may be achieved; in some cases enabling torque measurements that would otherwise not be possible. For example in torque measurements with low twist angles, as described above in the case of the relatively large, stiff shafts such as are in use in large industrial gas and steam turbines. Further, in areas of high electrical interference a high noise level may obscure strain signals; in this case increasing the twist over the reduced-stiffness region is advantageous. The concept is equally applicable for torque measurement on non-rotating components. Real time shaft torque may be acquired during operation of the shaft.

The device is connected directly to the shaft, without modifying the shaft. Hence the design and performance of the shaft are not compromised. This is in contrast to strain amplifying designs that introduce a weak link in the shaft where the strain is increased.

The two ends of the device are connected to the shaft at two axial positions. Between the two axial positions, the device has a portion of relatively small axial extent with relatively low torsional rigidity. This portion concentrates the twist of the extent of the device in the relatively small axial portion. As the twist is concentrated measurement is improved. This is in contrast to strain measurement devices that connect an elongate parallel structure to the shaft, the structure having a uniform torsional rigidity (in particular a uniform cross-sectional area) over its entire length.

Many large power generation shafts do not allow for easy access to the shaft ends. The shaft torque amplifier can be manufactured in two semi-cylindrical parts, each part spanning half the circumference of the shaft. The two parts can be fitted to the shaft without requiring access to the ends of the shaft. This is a further advantage.

Figure 2:
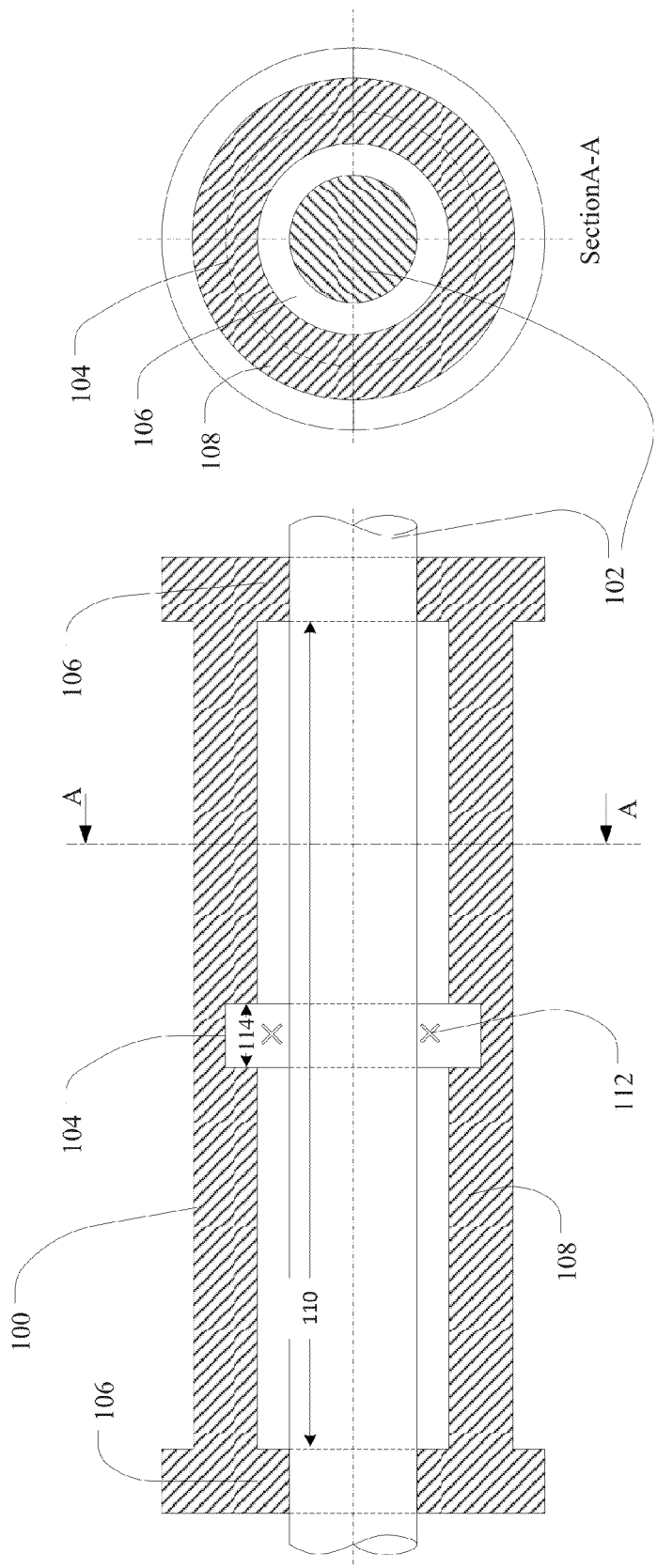
FIG. 2 shows an axial and longitudinal cross section of the mechanical shaft torque amplifier attached to a shaft.

FIG. 1 shows an isometric view of the mechanical shaft torque amplifier and FIG. 2 shows a longitudinal and a radial cross section of the mechanical shaft torque amplifier. The mechanical shaft torque amplifier 100 collects the twist of the shaft 102, over the length 110 between which the amplifier is connected to the shaft, and concentrates the twist over a short distance 114. The twist concentration distance 114 is of similar length as a strain gauge 112. In the twist concentration region 114 the coupling 108 has substantially reduced torsional stiffness. A circumferentially orientated groove 104 on the inner or outer surface of the shaft torque amplifier 100 induces a twist (and thus strain) concentration in said groove. The shaft torque amplifier 100 is connected to the shaft 102 at either extremity 106 of the shaft torque amplifier 100. Two semi-cylindrical parts 116, each part spanning half the circumference of the shaft, are clamped to the shaft 102.

For example if the twist (respectively strain) is measured with a 5 mm strain gauge directly on a relatively large, stiff shaft that twists in the order 0.2° per meter, then a twist of 0.001° (0.2*5/1000) is experienced by the strain gauge over its length. If however (for example) 100 mm of a shaft were available for the mechanical shaft torque amplifier, the twist experienced by the strain gauge would be 0.02° (0.2*100/1000). The larger twist experienced by the strain gauge produces a greater signal and improves the signal to noise ratio. In the described example the signal (and signal to noise ratio) is improved by a factor of the order of 20.

The length 110 of the shaft 102 available for the torque amplifier device 100 determines the twist experienced by the strain gauge. With the reduced-stiffness region 104 the overall stiffness of the shaft torque amplifier 100 on its own is relatively low. Therefore the contribution of the shaft torque amplifier 100 to the (relatively large) combined stiffness of the shaft 102 is negligible (or relatively small). This means that the relative twist between one extremity of the shaft torque amplifier to the other extremity is (at least in approximation) uninfluenced by the shaft torque amplifier. The longer the length 110 is, the larger the strain collected may be, and hence the more accurate the measurement becomes.

The aforementioned strain concentration arises from the difference in cross section between the cylindrical coupling 108 of the shaft torque amplifier and the groove 104. The cylindrical coupling is stiffer than the groove; thus the majority of the twist the amplifier undergoes occurs in the groove 104. The twist the amplifier undergoes is induced by fastening the amplifier to the shaft at both amplifier extremities. Thus the twist of the shaft is transferred through the amplifier body to the reduced-stiffness region. The twist between the amplifier extremities is concentrated in a small area.

The strain on the surface of the aforementioned groove can be measured via strain gauges with a full, half or quarter Wheatstone bridge circuit configuration. The aforementioned strain gauges can be arranged in a variety of orientations but preferably in a cross formation 112. Preferably, the strain gauges are fitted on the inner side of the device, thereby protecting the strain gauges from the environment and avoiding damage and contamination.

Figure 3:
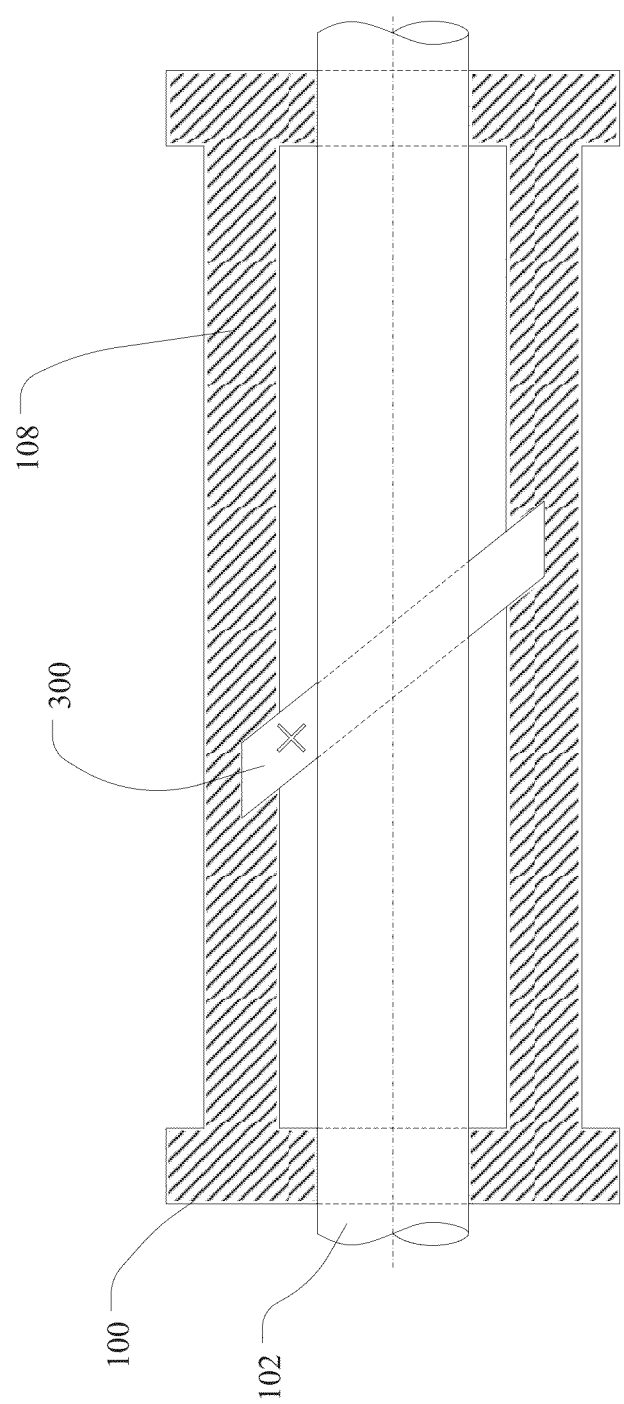
FIG. 3 shows an example of a variant groove with a different orientation.

FIG. 3 shows an example of a variant groove with a different orientation. Instead of the circumferential groove orthogonal to the axis of rotation, the groove 300 is set at an angle to the shaft torque amplifier's axis of rotation. The preferred angle of the groove may be parallel to the maximum strain direction, to give maximum strain induced. Under pure torsion the maximum strain direction angle is 45° to the shaft torque amplifier's axis of rotation. The groove may follow other planar or non-planar paths along the surface of the coupling 108; however to ensure the contribution of the shaft torque amplifier to the stiffness of the shaft is negligible (or relatively small), the groove preferably forms a closed circuit on the surface.

The reduced-stiffness section of the device may be adapted for application to a wide range of shaft torques and loading scenarios. For example by varying the depth of the groove the stiffness may be varied, thus changing the maximum torque the groove can withstand (and therewith the maximum measurable torque without failure of the amplifier). For example, the groove depth may be anything from around 5% to 95% of full thickness depending on the torque level; this level of stiffness reduction would be sufficient to collect the torque.

An important consideration in determining the groove depth (or stiffness reduction) is to keep the twist within the extension limit of the material such that no deformation occurs. When material deformation occurs the calibration may no longer be valid. Hence, the stiffness reduction is evaluated under consideration of the level of twist to be experienced and the material stiffness (yield stress). For example, if the shaft torque amplifier is of a relatively stiff material such as steel, a relatively small stiffness reduction (e.g. a relatively shallow groove) is permissible; if a material with a higher yield stress is used, such as an aluminium alloy, then a relatively large stiffness reduction (e.g. a deeper groove) is permissible. The stress under load should remain within the material extension limits and not exceed the yield stress.

For example, for a shaft torque amplifier of an aluminium alloy such as Dural, with an expected load of 2 degrees of twist per meter, for a cylindrical coupling 108 with 10 mm thickness, a thickness reduction of 10 to 25% (1 to 2.5 mm) may be sufficient. The thickness reduction could be larger, for example 5 mm, but over the life of the component (about 3 to 5 years) the reduced section may fatigue and eventually crack. Fatigue life for number of cycles to failure is another factor to consider in determining the thickness reduction.

Figure 4:
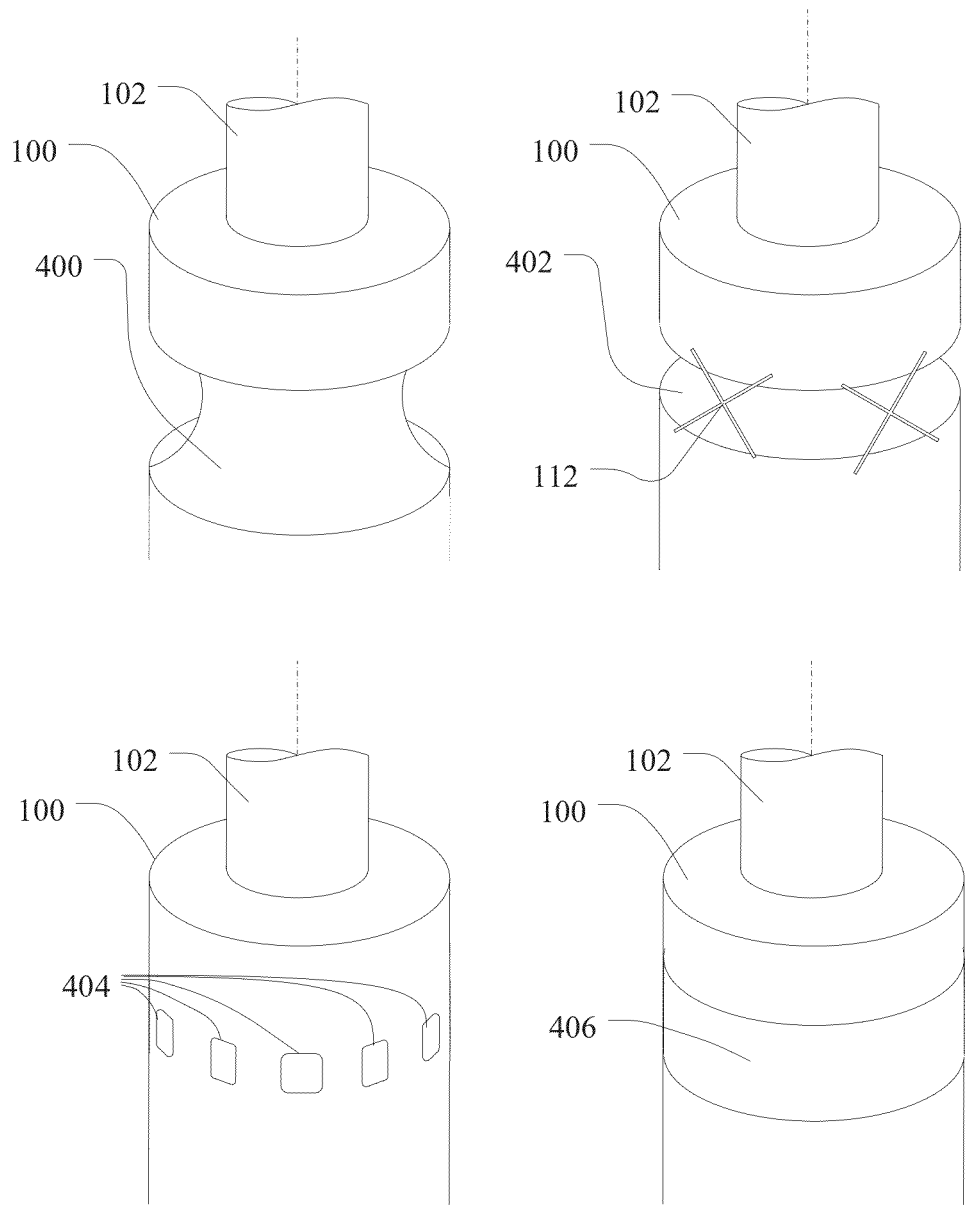
FIG. 4 shows examples of different reduced-stiffness sections.

FIG. 4 shows examples of different reduced-stiffness regions. If the groove is on the inner surface of the shaft torque amplifier, the strain gauges can be housed on the inside of the shaft torque amplifier, within the groove, for protection, thereby avoiding damage or contamination of said strain gauges, as discussed above. Alternatively, the groove 400 may be on the outer surface of the shaft torque amplifier.

Instead of a groove, a gap 402 may completely separate the two sides of the shaft torque amplifier (and merely strain gauges 112 bridge the gap). Instead of a groove or gap a series of holes 404 (recessed or through) may produce a section on the shaft torque amplifier with reduced stiffness. The holes may however establish non-uniform strain on the section with reduced stiffness, and require specific calibration of strain gauges depending on their placement. With a groove of uniform depth the strain concentration is uniform and thus all strain gauges can be calibrated together and the results received simply averaged.

The effective stiffness may also be controlled by inserting a section of different material 406 such as a weaker metal or a polymer.

Figure 5:
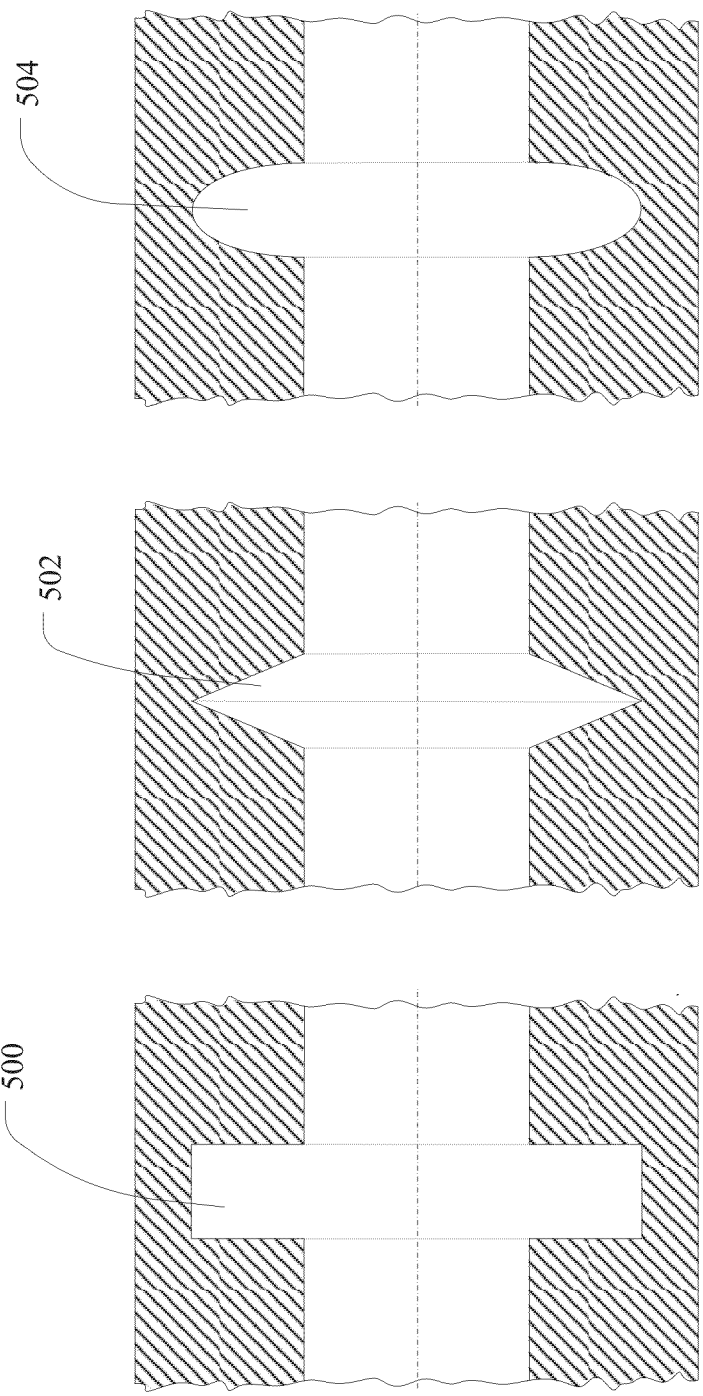
FIG. 5 shows examples of different groove geometries.

FIG. 5 shows examples of different groove geometries. The groove of the reduced-stiffness section may be shaped as a rectangular incision 500 as illustrated in FIGS. 1 and 2. FIG. 5 also shows alternative grooves such as a notched groove 502 and a necked groove 504.

Advantages of the circumferential groove include that it effectively "collects" strain from a large length and concentrates it. The groove provides a housing for protecting the strain gauges, in particular if the groove is on the inner surface of the shaft torque amplifier. The groove thickness can be adapted in dependence on the expected loading. With uniform groove depth around the entirety of the circumference (instead of recesses, for example) the strain concentration is uniform within the groove and thus all strain gauges can be calibrated together and the results received simply averaged.

Figure 6:
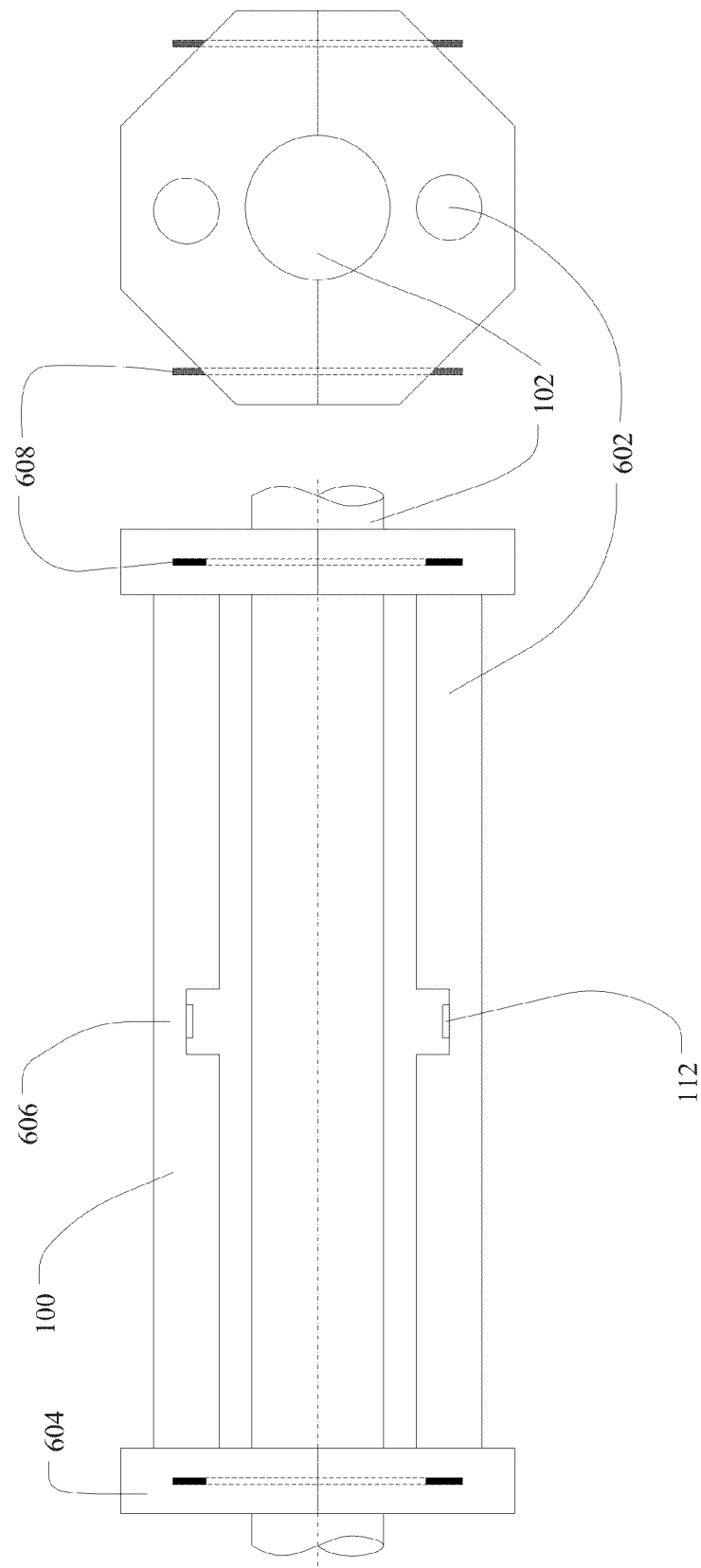
FIG. 6 shows an alternative design to a cylindrical sheath.

FIG. 6 shows an alternative design to a cylindrical coupling sheath as illustrated in FIGS. 1 and 2. A series of rods 602 replace the cylindrical sheath. Similar to the cylindrical sheath, the rods have a groove 606 to provide a short reduced-stiffness section where the twist is concentrated. The rods may be mounted in collars 604 that are fastened by a fastening means 608 (e.g. bolt and nut) onto the shaft 102. This design provides a more lightweight and easily accessible alternative. The strain gauges 112 may be mounted in the grooves 606 as before. The illustrated example shows a two rod embodiment, but more or less bars with a variety of cross-sections are also feasible.

Figure 7:
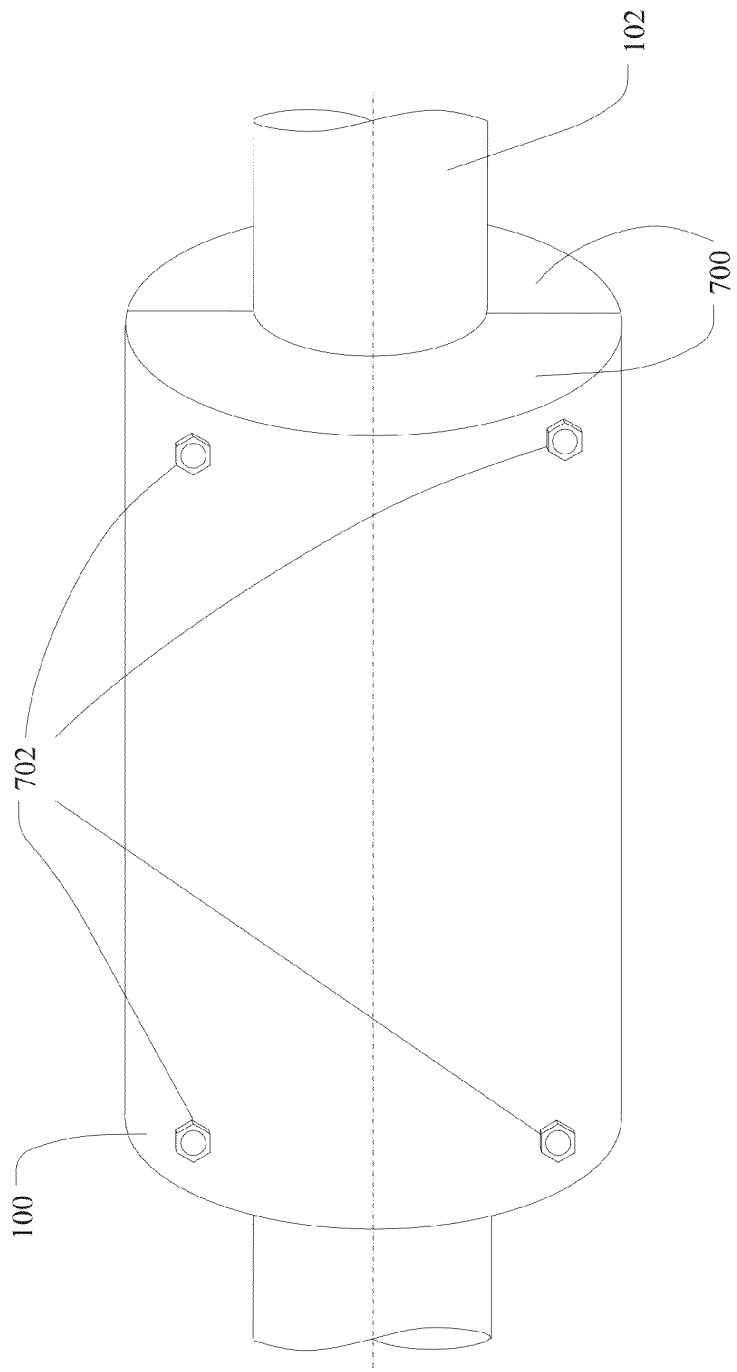
FIG. 7 shows the shaft torque amplifier manufactured in two halves that are fastened together onto the shaft.

Advantageously the shaft torque amplifier is manufactured in two halves that are fastened together onto the shaft. FIG. 7 shows an example of a fastening mechanism between two longitudinal shaft torque amplifier halves 700 and a shaft 102. Bolts 702 run through the two halves of the shaft torque amplifier and can be tightened to give appropriate grip. Rather than a smooth surface (as shown in FIG. 7) along the longitudinal joint of the two longitudinal shaft torque amplifier halves 700, provisions may be provided to ensure the longitudinal joint along the cylindrical sheath does not warp. For example, dowels, pins or castellations along the joint may assist fastening the halves together. The two halves may further be bolted together along the length of the longitudinal joint. Alternatively or in addition to the bolts 702, adhesives or alternative forms of attachment could be used. The clamping surface of the shaft torque amplifier may also be designed to fit a range of shafts of different diameter, for example with clamping jaws that are only in partial contact with the shaft. This would allow fitting of the same device to different shafts with different diameters.

By attaching two halves directly to the shaft, the shaft torque amplifier can be fitted to the shaft without requiring access to the end of the shaft. This avoids problems associated with attaching a torque measuring flange to the end of a shaft, which may not be easily accessible. The shaft torque amplifier can also be retrofitted to existing shafts. The shaft torque amplifier can provide simple installation and therefore may only require short installation time.

Further, replacement and servicing of the device and associated strain gauges may be undertaken as the system can be removed. This allows simple servicing and maintenance.

The shaft torque amplifier can be calibrated as a standalone system without the shaft. The shaft itself would not require calibration. The strain gauges can be calibrated by applying known strains to the shaft torque amplifier, with no need for calibration of the device for a specific shaft. The shaft torque amplifier can be calibrated using much lower levels of torque than experienced in the real situation, allowing calibration in the laboratory against simple equipment. Further, calibration for temperature changes can be carried out in the laboratory without requiring access to the shaft. Temperature calibration and correction may be implemented with a suitable temperature sensor such as a thermocouple.

Figure 8:
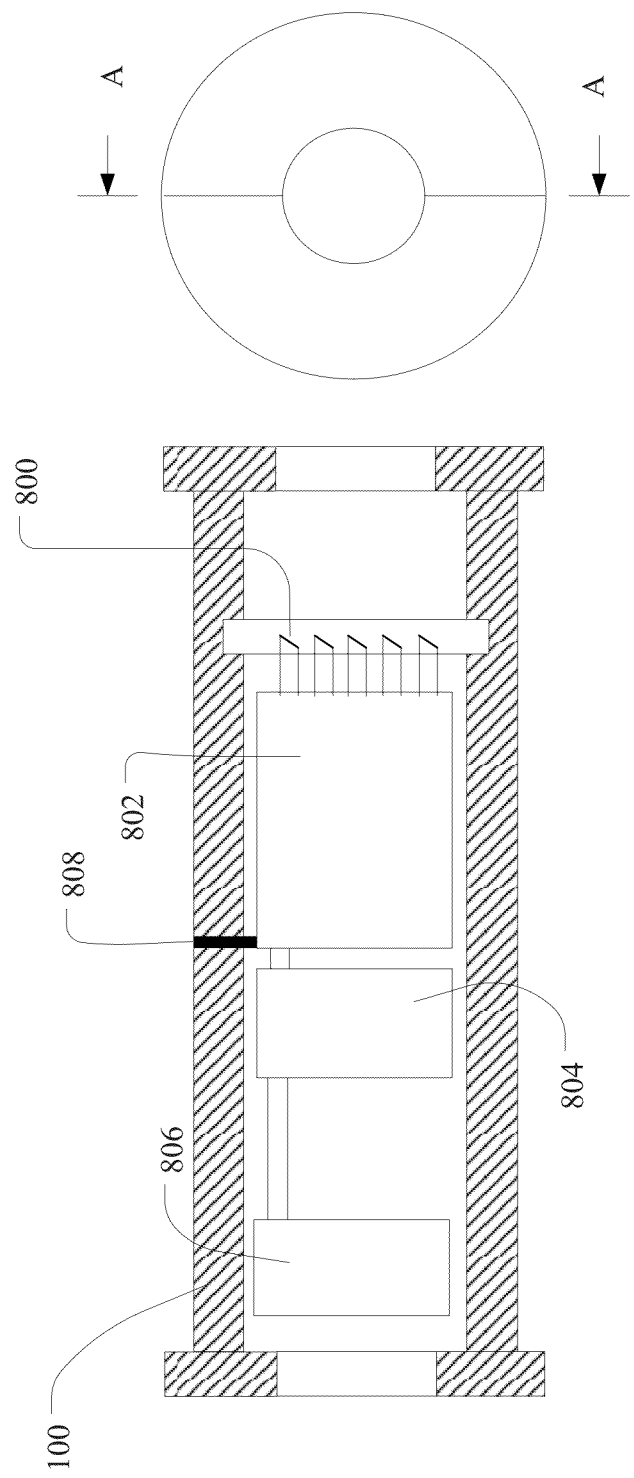
FIG. 8 shows the shaft torque amplifier supplemented by other parts.

FIG. 8 shows the shaft torque amplifier supplemented by other parts (along with appropriate connections between the parts). For example sensors 800, electronics 802 (e.g. for signal conditioning or data transmission), a power supply (e.g. a battery 804, optionally with a unit for power supply conditioning 806), a data transfer telemetry unit (e.g. an antenna 808) may be incorporated. By positioning the parts on the inside of the shaft torque amplifier the parts can be protected and the system can be made robust for an industrial environment.

Corrections to the data read out of the strain gauges may be applied on board the device in the course of signal conditioning. For example temperature correction could be performed in dependence upon temperature calibration data and environment data, for instance from a thermocouple.

The system may obtain power from an external source, for example via a non-contact connection, or a contact connection. The system may also self-generate power on board the shaft. For example, an on-board battery can be installed, which can be charged with a non-contact transformer type system.

The system may include a data transfer telemetry system such as a slip-ring or wireless system. The information obtained from the strain gauges can either be stored on board the shaft torque amplifier device, or transferred through a slip ring or wireless connection to a remote analysis system.

Figure 9:
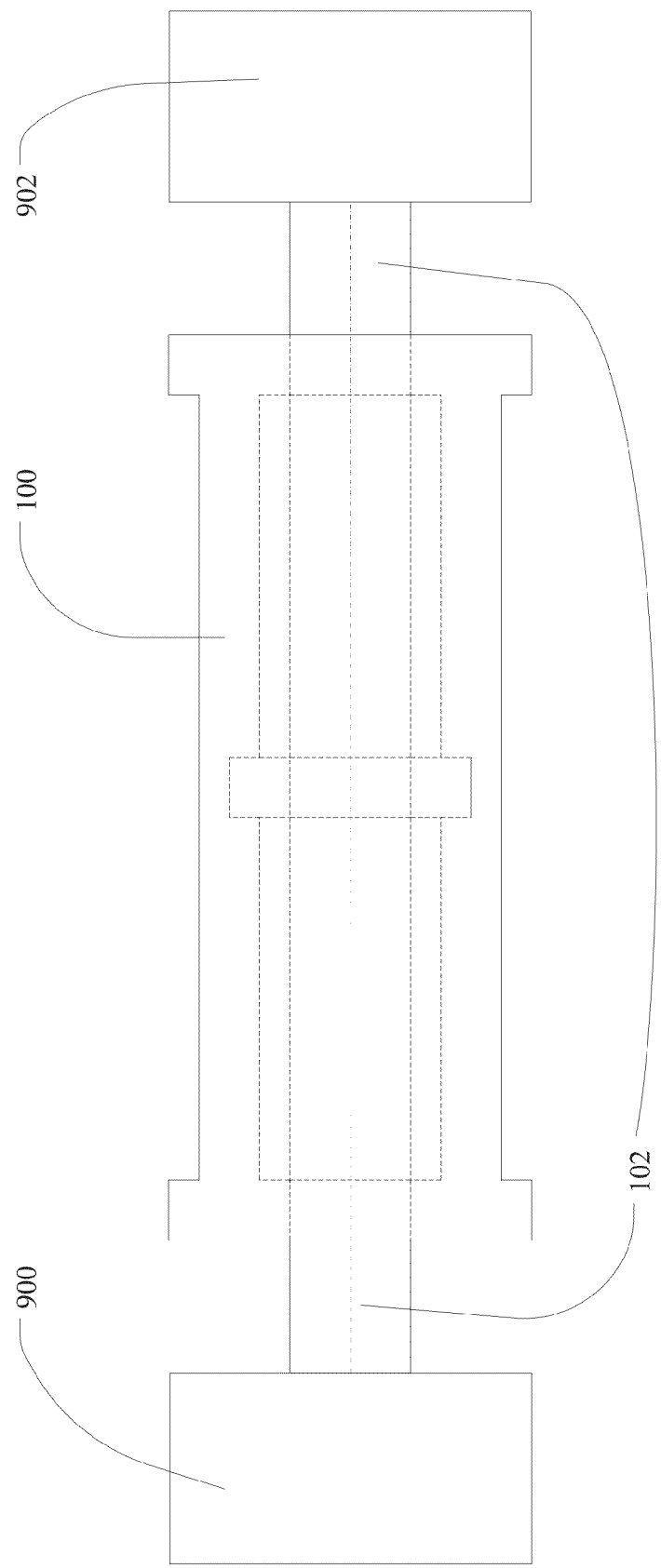
FIG. 9 shows the mechanical shaft torque amplifier in an example application.

FIG. 9 shows the mechanical shaft torque amplifier 100 in an example application, here with a shaft connecting an engine to an electrical generator. The shaft 102 is attached to both a torque provider (engine or power source) 900 at one end of the shaft; and a generator (opposing the torque) 902 at the other end of the shaft; and in the intermediate shaft section the shaft torque amplifier 100 measures the strain or twist and thereby provides information that relates to the torque transmitted by the shaft 102. With the torque information the power transmitted can be determined.

The mechanical shaft torque amplifier is further suitable for use on—for example—gear box shafts, wind turbines, ship propeller shafts, submarine propeller shafts, gas turbine shafts, and other similar shafts. For example, a particularly well-suited application of the mechanical shaft torque amplifier is in the measurement of torques on shafts used for electrical power generation. These environments typically have a high degree of electrical noise and in these cases the improvement in signal to noise ratio is particularly valuable.

For optimisation of the dimensions of the mechanical shaft torque amplifier the twist equation is analysed:

$$T = \frac{\varphi G J}{l} = \frac{\tau J}{R}$$

With torsion T, angle of twist φ, shear modulus G, torsion constant J, length l surface shear stress τ, and radius R.

The torque T to which the shaft-amplifier system is subject is characterised by the torque $T_1$ experienced by the main shaft and the torque $T_2$ experienced by the amplifier, with $T = T_1 + T_2$.

The twist φ to which the shaft-amplifier system is subject is characterised by the twist $\phi_1$ experienced by the main shaft and the twist $\phi_2$ experienced by the amplifier, with $\phi = \phi_1 = \phi_2$.

The twist $\phi_1$ experienced by the main shaft is:

$$\phi_1 = \frac{T_1 L_1}{J_1 G_1}$$

with shear modulus of the main shaft $G_1$, torsion constant of the main shaft $J_1$, and length of the shaft section with the amplifier $L_1$.

The twist $\phi_2$ experienced by the amplifier is:

$$\phi_2 = \frac{T_2(L_1 - L_B)}{J_A G_2} + \frac{T_2 L_B}{J_B G_2}$$

with shear modulus of the amplifier $G_2$, torsion constant of the thick region of the amplifier $J_A$, torsion constant of the weakened region of the amplifier $J_B$, and length of the of the weakened region of the amplifier $L_B$.

With $\phi_1 = \phi_2$ the equations are evaluated to find $T_2$ and $T_1$:

$$T_2 = \frac{T L_1}{J_1 G_1} \bigg/ \left( \frac{(L - L_B)}{G_2 J_A} + \frac{L_B}{G_2 J_B} + \frac{L_1}{J_1 G_2} \right)$$

$$T_1 = T - T_2$$

With the expressions for the torque, the nominal shear strain in main shaft $\gamma_1$ can be evaluated:

$$\gamma_1 = \frac{T r_1}{J_1 G_1} = \frac{\phi r_1}{L_1}$$

with the diameter of the main shaft $r_1$.

The shear strain $\gamma_B$ at the gauge (at the weakened region) is:

$$\gamma_B = \frac{T_1 r_{gauge}}{J_B G_2} = \frac{\phi_B r_{gauge}}{L_B}$$

with the diameter at the gauge $r_{gauge}$.

The amplifier gain is the ratio between the two shear strains:

$$\frac{\gamma_B}{\gamma_1} = \frac{T_2}{T} \frac{r_{gauge}}{r_1} \frac{J_1}{J_B} \frac{G_1}{G_2}$$

with (for hollow cylinders):

$$J = \frac{\pi}{2}(r_o^4 - r_i^4)$$

Figure 10:
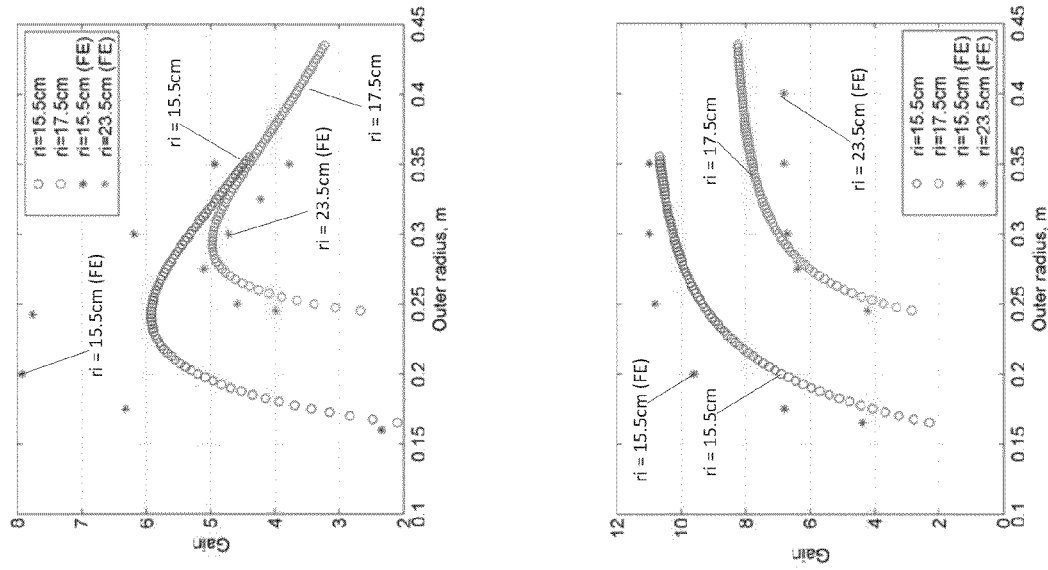
FIGS. 10 to 13 show the amplification gain for different mechanical shaft torque amplifier configurations.
Figure 10:
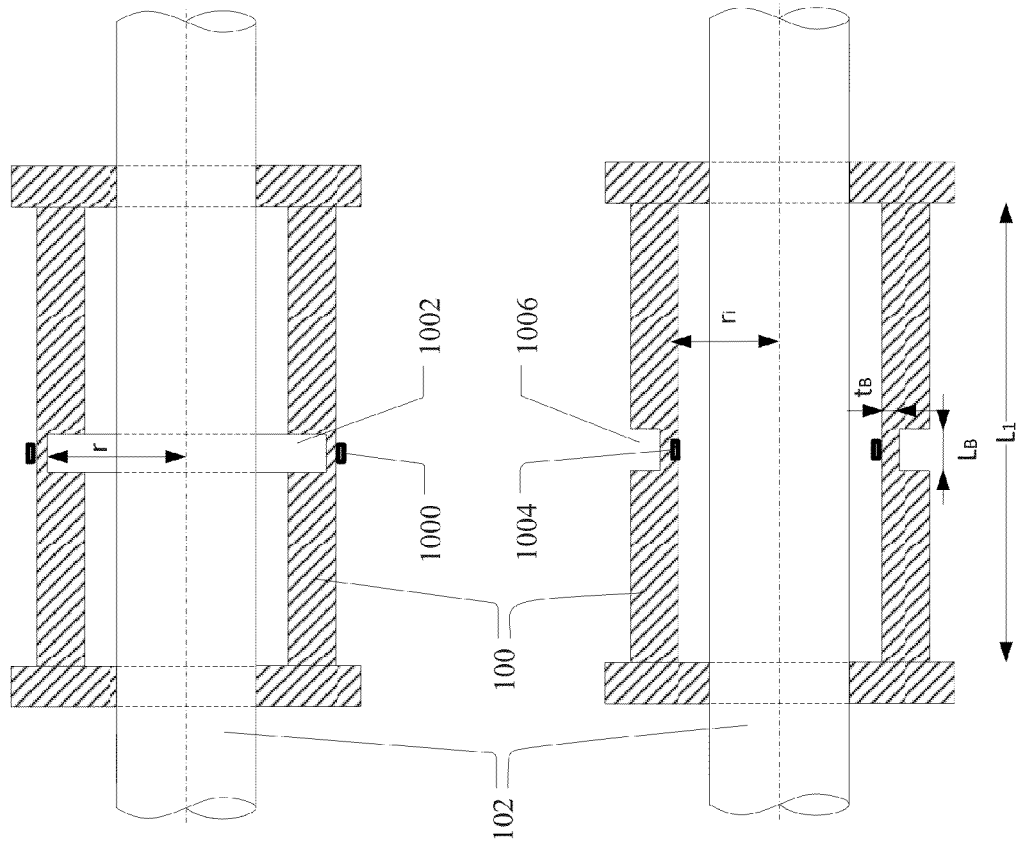

FIG. 10 shows two different configurations for the mechanical shaft torque amplifier. In the upper part of FIG. 10, the strain gauge 1000 is positioned at the outmost position of the mechanical shaft torque amplifier and $r_{gauge} = r_o$. The weakened region has a groove 1002 on the interior of the amplifier. In the lower part of FIG. 10, the strain gauge 1004 is positioned at the innermost position of the mechanical shaft torque amplifier and $r_{gauge} = r_i$. The weakened region has a groove 1006 on the exterior of the amplifier. On the right hand side of FIG. 10, amplifier gains for the different configurations are shown. The data is obtained from Matlab analysis of the equations described above (circle symbols), and from finite element analysis of the structure (star symbols). For the evaluation the length $L_1$, groove width $L_B$, and the thickness of the weakened region $t_B$ is same ($L_1 = 0.3$ m; $L_B = 0.01$ m; $t_B = 2$ mm).

Although the (simplified) Matlab model under-predicts the gain compared to the finite element model, the trends are comparable and can be used to investigate the design space.

Figure 11:
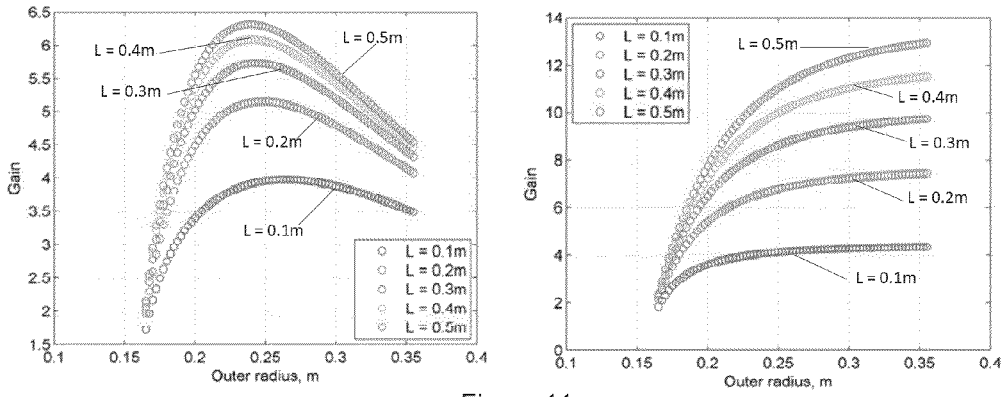
Figure 12:
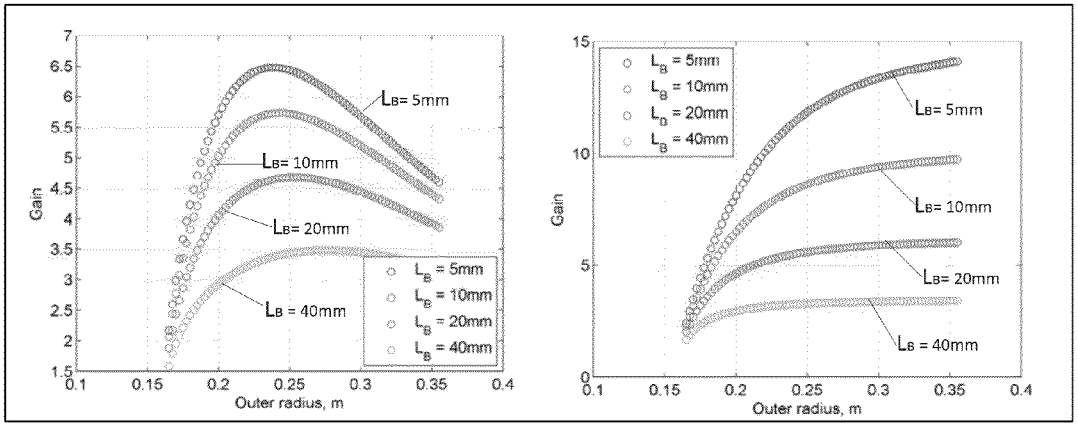
Figure 13:
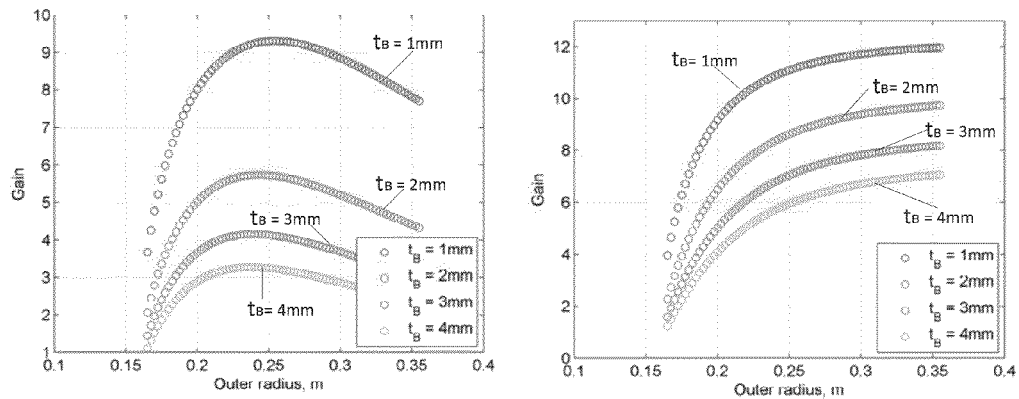

FIGS. 11 to 13 show further evaluations of design parameters of the mechanical shaft torque amplifier. FIG. 11 shows the gain for the outer (left figure) and inner (right figure) shear gauge configurations with varying amplifier length $L_1$ ($L_B = 0.01$ m; $r_i = 0.155$ m; $t_B = 2$ mm). FIG. 12 shows the gain for the outer (left figure) and inner (right figure) shear gauge configurations with varying groove width $L_B$ ($L_1 = 0.3$ m; $r_i = 0.155$ m; $t_B = 2$ mm). FIG. 13 shows the gain for the outer (left figure) and inner (right figure) shear gauge configurations with varying thickness of the weakened region $t_B$ ($L_B = 0.01$ m; $L_1 = 0.3$ m; $r_i = 0.155$ m).

The evaluation of the design space as described above shows that a gain in the region of 10 can be achieved. Mounting the strain gauge on the inner radius is advantageous, as this enables greater gains to be achieved. Increasing $r_i$ is beneficial to a point; however the torque in the amplifier increases as $r_i$ increases and the stress levels increase correspondingly. The gain increases with overall amplifier length $L_1$. The gain increases as $t_B$ decreases. The gain increases as $L_B$ decreases.

As previously mentioned, the material of the weakened section is important. The modulus (in particular the shear modulus) of the material of the weakened section contributes to the effectiveness of the amplifier. The amplifier may be designed to take advantage of the material influencing the weakness in the weakened region, for example as shown in FIG. 4 on the bottom right, where the weakened region 406 is of a weaker material. Different ways of interfacing the different materials may be chosen as appropriate. Other configurations are possible, including for example composite materials that have a weak region or materials that have been subjected to for example chemical or physical treatment in order to weaken a portion.

While the invention has been described in reference to its preferred embodiments, it is to be understood that the words which have been used are words of description rather than limitation and that changes may be made to the invention without departing from its scope as defined by the appended claims.

Each feature disclosed in the description, and (where appropriate) the claims and drawings may be provided independently or in any appropriate combination.

The invention claimed is:

1. An apparatus for determining torque in a shaft, the apparatus comprising:
   an elongate member with a weakened region partway along its length, the region being weakened by a reduction in thickness of the elongate member is said region, said reduction in thickness being in the shaft radial direction; and
   a securing mechanism configured for securing the member to the shaft either side of the weakened region, the apparatus thereby able to determine torque in said shaft.

2. An apparatus according to claim 1, wherein the weakened region is characterised by a groove, wherein the groove is on the inner surface of the elongate member.

3. An apparatus according to claim 1, wherein the elongate member is in the shape of a rod or a plurality of rods.

4. An apparatus according to claim 1, wherein the elongate member is arranged to enclose an axial shaft portion.

5. An apparatus according to claim 2, wherein the weakened region is of uniform depth around a circumference of the elongate member.

6. An apparatus according to claim 4, wherein the elongate member is in the shape of a cylinder.

7. An apparatus according to claim 1, further comprising a strain gauge mounted on an inner surface of the elongate member.

8. An apparatus according to claim 7, wherein the weakened region has approximately the same length as the strain gauge.

9. An apparatus according to claim 1, further comprising at least one of the following: a battery; an electronic signal processing unit; a data transfer telemetry unit; and a power supply unit.

10. An apparatus according to claim 1, the securing mechanism for securing the member to the shaft either side of the weakened region being adjacent each end of the elongate member.

11. An apparatus according to claim 1, wherein the securing mechanism for securing the member comprises a pair of collars for clamping to a shaft, wherein the elongate member is connected at each end to a respective collar.

12. An apparatus according to claim 1, further comprising a torque determining mechanism for determining torque, wherein torque is determined by measuring at least one of: angle of twist; strain.

13. An apparatus according to claim 1, wherein the torsional stiffness ratio between: the elongate member with the weakened region; and the weakened region only; is less than 5:1.

14. An apparatus according to claim 1, wherein the ratio between the length of the elongate member and the length of the weakened region is between 100:1 and 5:1.

15. An apparatus according to claim 1, wherein the torsional stiffness ratio of the shaft and the apparatus is greater than 10:1.

16. A method of localising the twist a shaft undergoes, comprising:
    providing an elongate member having a weakened region partway along its, the region being weakened by a reduction in thickness of the elongate member in said region, said reduction in thickness being in the shaft radial direction; and
    securing the elongate member to a shaft,
    such that when the shaft undergoes twist, the twist is transmitted to the elongate member, whereby the weakened region of the elongate member undergoes a greater twist than the remaining elongate member, thereby localising the twist in the weakened region.

17. A method according to claim 16, wherein the member is secured to the shaft either side of the weakened region, adjacent each end of the elongate member and preferably wherein the weakness of the weakened region is adapted in dependence on the pre-determined maximal twist the shaft undergoes.

18. An apparatus according to claim 1, wherein the reduction in thickness is between 5% and 95% of the thickness of the elongate member in the shaft radial direction.

19. A method according to claim 16, wherein the elongate member comprises a first material and a second material having a lower shear modulus than said first material, and wherein the weakened region of the elongate member is formed by said second material.

20. An apparatus for determining torque in a shaft, the apparatus comprising:
    an elongate member comprising first material and a second material having a lower shear modulus than said first material, the elongate member having a weakened region formed by said second material and arranged partway along a length of the elongate member, said weakened region being at a given radial extent from the shaft axis; and
    a securing mechanism configured for securing the member to the shaft either side of the weakened region, the apparatus thereby able to determine torque in a shaft.

21. A method of localizing the twist a shaft undergoes, comprising:
    providing an elongate member comprising a first material and a second material having a lower shear modulus than said first material, the elongate member having a weakened region formed by said second material and arranged partway along the length of the elongate member, said weakened region being at a given radial extent from the shaft axis; and
    securing the elongate member to a shaft,
    such that when the shaft undergoes twist, the twist is transmitted to the elongate member, whereby the weakened region of the elongate member undergoes a greater twist than the remaining elongate member, thereby localizing the twist in the weakened region.

* * * * *